April 14, 1931.   A. M. STYX   1,801,241
COMBINATION SALT AND PEPPER SHAKER
Filed Jan. 25, 1928
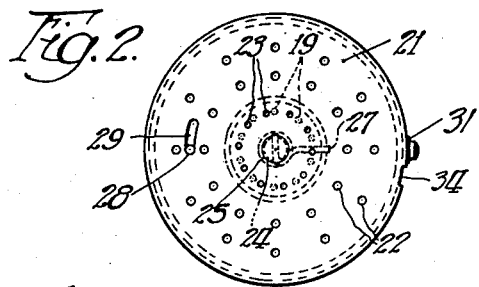
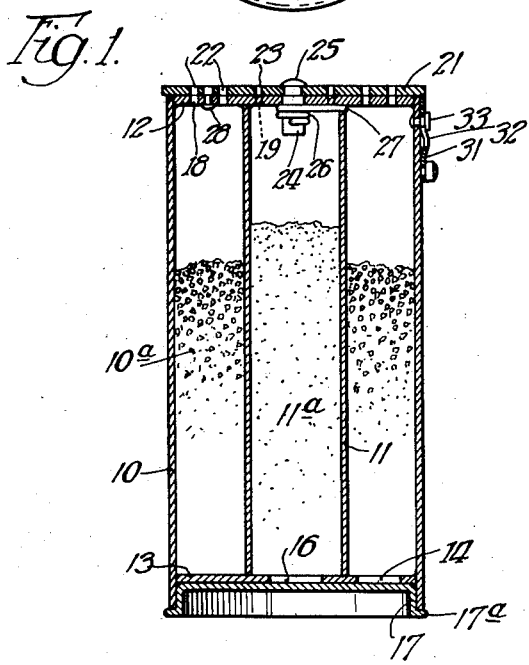
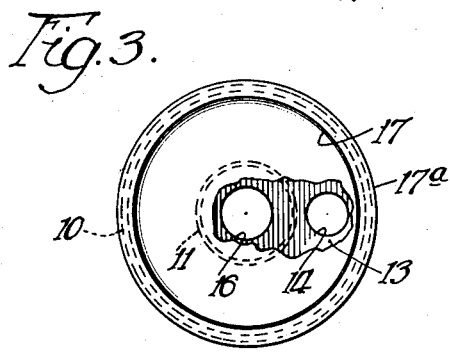
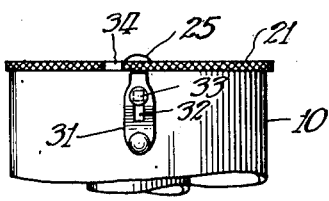
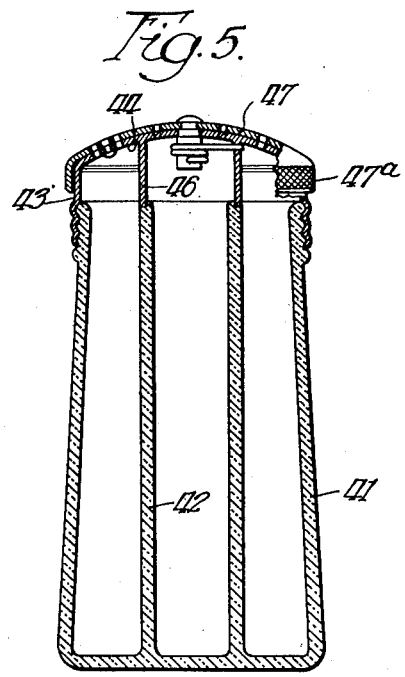
Inventor
Abigail M. Styx
George E. Mueller
Atty.

Patented Apr. 14, 1931

1,801,241

UNITED STATES PATENT OFFICE

ABIGAIL M. STYX, OF CHICAGO, ILLINOIS, ASSIGNOR OF ONE-HALF TO WILLIAM F. BINA, OF CHICAGO, ILLINOIS

COMBINATION SALT AND PEPPER SHAKER

Application filed January 25, 1928. Serial No. 249,221.

My invention relates in general to salt and pepper shakers and more particularly to an improved shaker adapted to contain both salt and pepper, either one of which may be shaken therefrom as occasion or the dictates of taste require.

Combination salt and pepper shakers have been suggested in the past but within my knowledge have not met with favor. I propose certain improvements on such articles, and particularly an arrangement such as will greatly simplify the use thereof and at the same time fit the composite article for special utility for emergencies or unusual service, as for example for use in the open, in camps, on hunting and fishing trips, or the like.

One of the principal objects of my invention is the provision of an improved salt and pepper shaker.

Another object is the provision of a salt and pepper shaker designed normally to shake salt, but adapted to be adjusted readily to spread pepper.

Another object is the provision of a salt and pepper shaker of the class described which may be regulated so that neither salt nor pepper may be shaken therefrom.

Another object is the provision of a combination salt and pepper shaker of the class described adapted to be employed as a decorative or ornamental article for distinctive table use, or to be incorporated in strictly utility form for relatively rough use.

Another object is the production of a combination salt and pepper shaker capable of being regulated to produce either salt or pepper independent of the position in which it is held in the hand.

My invention is illustrated in the accompanying drawings wherein—

Fig. 1 is a vertical sectional view showing one form particularly adapted for camp use;

Fig. 2 is a plan view thereof;

Fig. 3 is a bottom view;

Fig. 4 is a fragmentary side elevational view showing one manner of preventing discharge of both salt and pepper, and Fig. 5 is a vertical sectional view of a form particularly adapted for table use.

In the forms shown in Figs. 1 to 4 inclusive, which will be described first, the salt and pepper shaker comprises an outer cylinder 10, an inner cylinder 11, a top stationary plate 12 and a bottom plate 13. This arrangement gives rise to two compartments, namely 10a adapted to contain salt, and 11a in the center thereof adapted to contain pepper. The chamber 10a is provided with one or more openings 14 and the chamber 11a with an opening 16 through which openings the said chambers may be filled, and which openings are sealed by a bottom closure member 17, in the manner shown, which member is screwed or otherwise held in the flanged bottom of the cylindrical portion 10. This bottom closure member is provided with a bottom flange 17a projecting outwardly beyond the cylindrical member 10, thus facilitating the application or removal of the closure member and at the same time permitting the closure member to act as a base on which the article stands.

The top stationary plate 12 is provided with apertures 18—18 leading into the compartment 10a and similar apertures 19 leading into the compartment 11a through which on proper occasion the contents of such compartments may be shaken.

In order to regulate the use of such holes, however, a movable plate 21 is provided on top of the plate 12 and has apertures 22—22 and 23—23 adapted to be lined up with the apertures 18—18 and 19—19, these apertures being so positioned however, that when the apertures 18—18 and 22—22 are in line, the apertures 19—19 and 21—21 will be entirely out of line.

As a mounting for the movable top plate 21, I provide a pin 25 adapted to turn with the movable plate 21, this being secured by making the portion of the shank thereof of angular cross section. The lower portion 24 of the shank is round in cross section and extends through a central opening in the stationary plate 12 so as to be rotatable with respect thereto. This shank has wound thereon, a coil spring 26, one end of which is secured to the shank 24 and the other end secured in an immovable position with respect to the plate 12, this being secured in any suitable way, as for example by extending this end of the spring into a suitable aperture provided in the wall of the cylinder 11 as indicated at 27.

With this arrangement, it is clear that as long as the spring is under tension there will be a tendency to drive the plate 21 in a clockwise direction (that is when looking down on the top as in Fig. 2). To limit the movement of the plate 21, a stop pin 28 is secured in the plate 12, with its end projecting upwardly into an arcuate slot 29 provided in the plate 21. The arrangement of the apertures in the plates, and the stop and arcuate slot are such that the plate when held in normal position by the spring as in Fig. 2, will cause the apertures 18—18 and 22—22 to be in line, thereby permitting the discharge of salt from the compartment 10a, without adjusting the article in any way. By engaging the plate 21, however, and moving it in a counter clockwise direction, the apertures in the two plates are lined up so that no salt can be discharged but the pepper can be shaken through the apertures 19 and 23 to discharge the same from the compartment 11a. In order to facilitate the engagement of the plate 21, I make it of greater diameter than the cylinder 10, thereby extending it over the top edges thereof and also beyond the stationary plate 12, as shown. With this arrangement, the plate 21 can be reached independent of the position in which it is held in the hand, and moved with the thumb or any one of the fingers as the convenience of the user seems to dictate.

When the plate 21 is in a position so that the stop pin 28 is about at the center of the arcuate slot 29, neither the pepper nor salt holes will be open. I provide an arrangement therefore so that the plate 21 can be locked in this position, as is very desirable when the article is being transported as for example with camping luggage. In this connection, I provide a spring clip 31, with a vertical slot 32, through which the square shank of a rivet 33 extends, this rivet being secured to the cylinder 10. The upper part of this clip is narrowed, as shown in Fig. 4, and is adapted to extend into a cut away portion 34 on the periphery of the movable plate 21, this cut away portion 34 being so disposed with respect to the slot 29 that when the holes are all closed, this cut away portion 34 will be right in line with the clip 31. This clip is simply pushed upwardly and it being formed of spring material and shaped in the manner shown, it will have sufficient friction to hold itself in place.

In the embodiment shown in Fig. 5, the salt and pepper chambers are made to open at the top, and the salt and pepper regulating feature is incorporated with a cap adapted to be screwed onto the body or removed therefrom for the purpose of replenishing the same.

In this form, there is a body 41 made of any suitable material as for example, glass, china or the like, with a centrally disposed integral cylindrical portion 42, giving rise to two compartments for containing salt and pepper respectively, as in the main form. The cap comprises an immovable portion 43 adapted to be screwed onto the top of the body in the manner shown, and having an integral arcuately shaped top 44 which contains the salt and pepper holes. A cylindrical insert 46 on the underside of the arcuate stationary top, is adapted to engage the upper part of the cylindrical portion 42 to completely close off the two compartments at the top in the manner shown. The movable plate 47 is shaped to conform to the top 44 and is secured with respect thereto in the same manner as in the embodiment of the invention previously described. This movable top 47, however, has an apron-like flange 47a, extending around the top of the stationary portion 43, this flange being knurled or otherwise roughened on the outside to facilitate engagement thereof with the fingers. The other portions of this embodiment are practically the same as the main figure, with the exception that the spring clip 31 is omitted, because for table use it will not be necessary to close off the salt and pepper openings entirely.

The advantages to be secured from the novel features of my invention are obvious. Salt is used a great many more times than pepper and for this reason the arrangement is such that the person unacquainted with the article which he picks up and simply inverting the same and shaking it, will get the condiment which he expects, namely salt. If it is the exceptional time, however, and he wishes to employ pepper, he simply turns the plate 21 or 47 as the case may be, as he holds the article in his hand, the turning being effected by the thumb or index finger of the hand in which the article is grasped. Then inverting the article sufficiently to expel the contents thereof, and subjecting it to the conventional shaking operation, will have the effect of releasing pepper. With the arrangements shown in Figs. 1 to 4, wherein the top can be enclosed entirely, great advantage is secured in travelling. As to filling the salt and pepper compartments, this is as easy with either embodiment as in the ordinary salt and pepper shakers.

It is not to be supposed that the embodiment of Figs. 1 to 4 inclusive, or the embodiment in Fig. 5 have to be used in the form shown, and without the modifications shown in the other form. On the contrary, the device of Fig. 1 may be provided with a rounded top, or arranged to be filled at the top, produced from glass or in any other way embracing any of the features of Fig. 5. Fig. 5 can be modified to employ the flat top of Fig. 1. It can be equipped with the spring clip 31 or changed in other ways. This explanation will indicate that I do not intend to restrict myself to the particular forms shown in the drawings and described above, but the invention is limited only by the scope of the appended claims.

What I claim as new and desire to secure by United States Letters Patent is:

1. In a combination salt and pepper shaker, a cylindrical salt compartment, a cylindrical pepper compartment disposed concentrically therein, a fixed closure member covering said compartments and having apertures into each of said compartments, a movable closure member having cooperating apertures adapted for alignment with the apertures of either of said compartments, means for limiting the movement of said closure member, means retaining the closure member in a neutral position wherein none of the apertures are in alignment, comprising a square shank pin secured to the shaker, and a spring clip having a slot engaging said shank and longitudinally movable to engage the movable closure member, and means for normally retaining the apertures of the salt compartment in alignment.

2. In a combination salt and pepper shaker, a cylindrical salt compartment, a cylindrical pepper compartment disposed concentrically therein, a fixed closure member covering said compartments and having apertures into each of said compartments, a movable closure member having cooperating apertures adapted for alignment with the apertures of either of said compartments, said movable closure member having an arcuate slot therein, a stud secured to the fixed closure member and extending into said slot for limiting the movement of the movable closure member, means for retaining the closure member in a neutral position wherein none of the apertures are in alignment, comprising a square shank pin secured to the shaker, a spring clip having a slot engaging said shank and longitudinally movable to engage the movable closure member, and resilient means for normally retaining the apertures of the salt compartment in alignment.

In witness whereof, I hereunto subscribe my name this 18th day of January, 1928.

ABIGAIL M. STYX.